Nov. 1, 1938.   D. C. REYNOLDS   2,134,930

TAMPON AND METHOD OF MAKING IT

Filed Sept. 3, 1935   2 Sheets-Sheet 1

INVENTOR.
Dutton C. Reynolds
BY Lyon & Lyon
ATTORNEYS

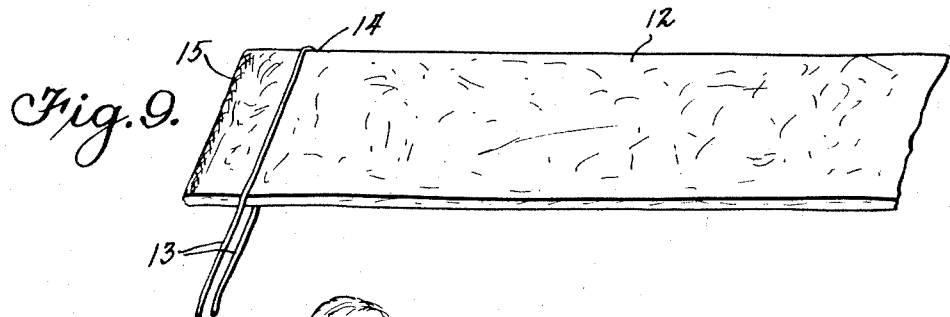
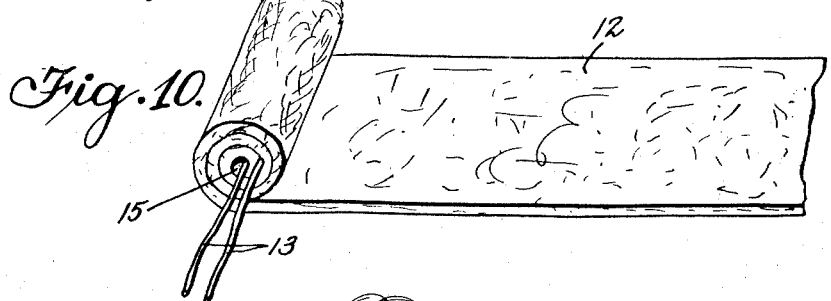
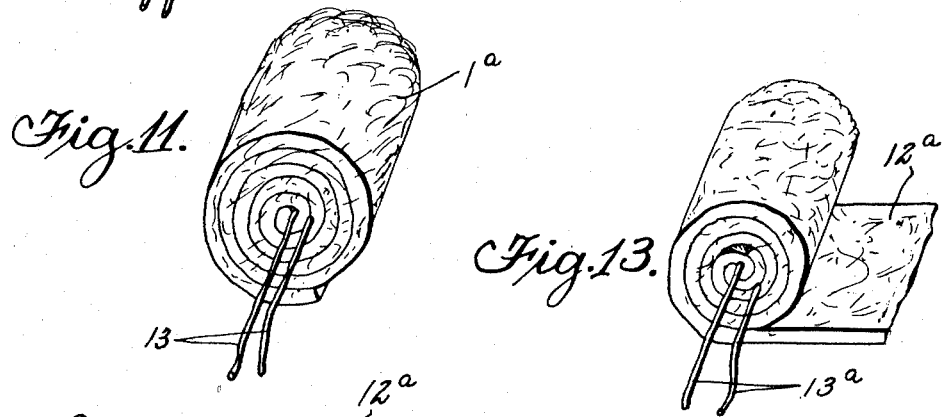
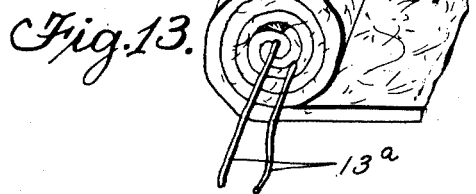
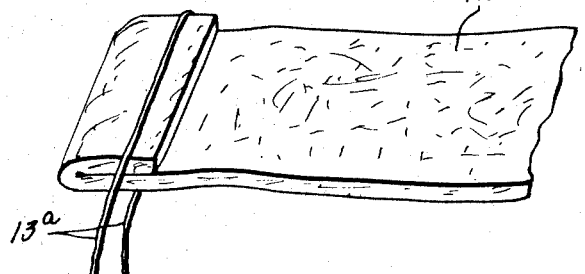

Patented Nov. 1, 1938

2,134,930

UNITED STATES PATENT OFFICE 2,134,930

TAMPON AND METHOD OF MAKING IT

Dutton C. Reynolds, Los Angeles, Calif., assignor to Holly-Pax, Inc., Los Angeles, Calif., a corporation of California Application September 3, 1935, Serial No. 38,861

10 Claims. (Cl. 128—285)

This invention relates broadly to absorbent pellets or tampons made of fibrous materials and adapted for insertion into body cavities for the absorption and retention of liquid secretions. Although having other fields of usefulness, the present invention probably has its greatest utility as a vaginal tampon for the absorption and retention of menstrual discharges, being used in place of an external sanitary napkin or pad.

A broad object of the invention is to provide a tampon which expands in the presence of moisture and increases its porosity as it expands whereby it may be made of small dimensions for economy in shipment, storage and handling, and convenience in carrying, while having the same absorption capacity as much larger tampons of previously known types.

Another object is to provide a tampon which is normally compact and relatively hard and rigid but which expands in the presence of moisture into a much larger, yet soft, and resilient body, whereby it may be easily inserted into a body cavity but after insertion, expands to more or less fill the cavity while at the same time conforming to the shape of the cavity, and yielding in response to movement of the cavity walls, thereby avoiding any discomfort to the user.

Still another object of the invention is to provide a practicable method of producing tampons having the foregoing desirable characteristics.

Still another object is to provide an effective method of securing a cord or tape to a tampon of absorbent material such as cotton, which has little strength when wet, whereby a wet tampon may be withdrawn from a body cavity by pulling on the cord attached thereto, without the cord tearing away from part or all of the tampon.

In accordance with the invention, I achieve the first and second objects listed above by first forming a loose, fluffy tampon of relatively large dimensions from an absorbent fibrous material such as cotton in dry condition and compressing the tampon while still dry substantially to its limit of compressibility, so that the individual fibers are closely packed together. I have found that by applying extremely high pressure to a loose, dry cotton tampon, it may be condensed to a small fraction of its original size and that it remains small and compact after the pressure is removed so long as it remains dry, but that if it is wetted it immediately expands substantially to its original dimensions and absorbs as much liquid as it would if it had not been compressed.

It is important to note that the foregoing result is obtained only with extreme pressure. If a loose cotton tampon is momentarily compressed while dry to say half its original volume, then when the pressure is removed the tampon quickly re-expands to nearly its original volume. It is also important that the tampon be first formed to the desired size and shape and then compressed directly inwardly so that there is no wrapping of the fibres to prevent their free separation when wetted.

Special methods of attaining the foregoing objects will now be described with reference to the drawings, in which—

Fig. 9 is a perspective view of a strip of material to be wound into a tampon, showing one way of attaching a pull cord thereto;

Fig. 10 is a perspective view showing the strip of Fig. 9 partly rolled;

Fig. 11 is a perspective view showing the strip of Fig. 9 fully rolled;

Fig. 12 is a perspective view of a portion of a strip of material to be wound into a tampon, showing an alternative method of attaching a pull cord thereto;

Fig. 13 is a perspective view showing the strip of Fig. 12 partially rolled; and Fig. 14 is a perspective view of a tampon constructed in accordance with Figs. 9 to 13, after it has been compressed.

Figure 1:
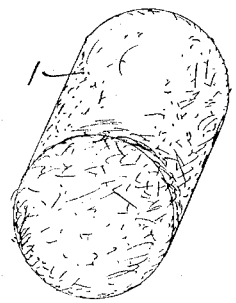
Fig. 1 is a perspective view of a body of material to be formed into a tampon in accordance with the invention.

As has been previously indicated, the essence of the present invention is a tampon that may be exactly similar to those of the prior art except that it has been compressed in dry condition substantially to the limit of compressibility of the material. Hence my tampons can be made from existing tampons, such as shown in Fig. 1, which simply consist of a roll or cylinder 1 of loose, fluffy, absorbent, fibrous material such as cotton wool.

Figure 2:
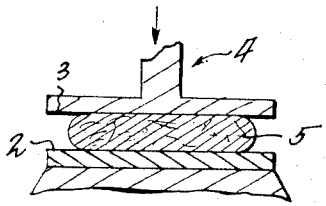
Fig. 2 is a schematic view illustrating the first step in compressing the body of material shown in Fig. 1.
Figure 3:
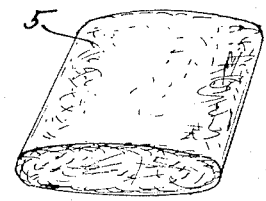
Fig. 3 is a perspective view of the flattened body produced by the operation illustrated in Fig. 2.
Figure 4:
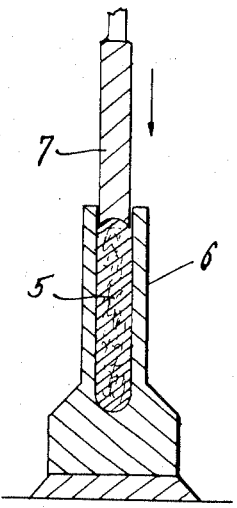
Figs. 4 and 5 are schematic views illustrating the second step in compressing the body of material.
Figure 5:
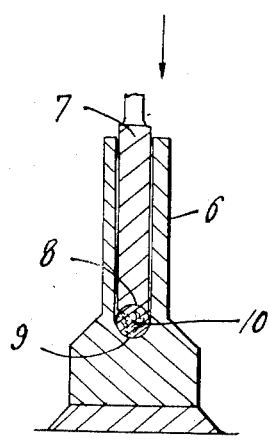

Various methods may be employed for compressing the roll 1, but to simplify the disclosure a very simple method is described. Thus as shown in Fig. 2, the roll may first be flattened by compressing it between the two flat plates 2 and 3 of a suitable press 4. Sufficient pressure is applied to compress the cylindrical roll into a flattened body 5, as shown in Fig. 3, and this body 5 is then placed in a die 6 (Fig. 4) and further compressed into substantially cylindrical shape with a plunger 7. The dimensions of the die 6 are so chosen with respect to the size and density of the original roll 1 that the limit of compressibility of the material is reached approximately when the curved faces 8 and 9 of the plunger 7 and die 6 are so positioned as to define a cylindrical surface. Under these conditions I find that the resultant cylindrical tampons 10, if cotton is used as the fibrous material, expands only very slightly after the pressure is removed. It is relatively dense and rigid and remains so indefinitely provided it is kept dry. As soon as it is wetted, however, it expands radially substantially to its original diameter which was several times the diameter of the compressed tampon 10.

Naturally, as the material expands it becomes more porous and is capable of absorbing substantially the same amount of liquid as if it had not been compressed.

Figure 7:
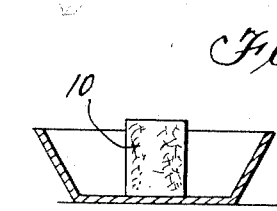
Figs. 7 and 8 are schematic views illustrating the expansion of the tampon shown in Fig. 6 when it is wetted.
Figure 8:
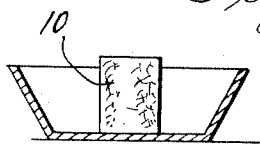

The expansion and absorbent properties of the tampon 10 may be easily demonstrated by placing the end of the tampon in a dish containing water as shown in Figs. 7 and 8. The immersed end of the tampon immediately swells up and then, as the water rises by capillary attraction to the upper end of the tampon, the entire tampon quickly swells to several times its diameter while dry, although retaining its same general shape.

In a body cavity, particularly the vaginal canal, expansion occurs slowly as secretions are absorbed and the expanding tampon becomes soft and conforms to the shape of the cavity, thereby preventing any possible discomfort.

The small diameter and relative rigidity of the dry tampon 10 greatly facilitates the insertion of it into the vagina.

To facilitate removal of wet and expanded tampons from body cavities, it is desirable, although not absolutely necessary, to have a pull cord attached to the tampon, which cord can be left extending from the cavity at the time of insertion and used to drag out the wet and expanded tampon when it is to be removed.

Since cotton wool and similar absorbent materials do not have much tensile strength when wet, the pull cord must be firmly anchored to the tampon if it is not to pull away therefrom. In accordance with the present invention, I provide an effective method of anchoring a pull cord to a tampon. This method will now be described with reference to Figs. 9 to 14.

By this method, loose rolls analogous to the roll 1 in Fig. 1 are formed by winding up on itself a strip of cotton batting of width equal to the length of the finished tampon and of such length relative to its thickness as to form a roll of desired diameter.

Such a strip is shown at 12 in Fig. 9, and a pull cord 13 is looped over one edge 14 of the strip and the ends of the cord extended back across the strip on opposite faces thereof, and thence away therefrom. The strip is then wound upon itself beginning at the end 15 adjacent the cord 13 as shown in Fig. 10. The completely wound roll 1a (Fig. 11) is then compressed as described with reference to Figs. 2, 4 and 6, into a compact rigid tampon 10a (Fig. 14).

The surface fibers of the different layers of the roll 1a felt themselves together to a considerable extent in the winding and compressing operation and it is found that even after the finished tampon has been wetted and expanded, a considerable force is required to tear the cord out of the tampon.

The cord 13 may be even more firmly anchored in the tampon by folding the inner end of the strip (12a in Fig. 12) back and looping the cord 13a over the double thickness before winding the strip. The appearance of a partially rolled tampon with the cord looped over the folded end is shown in Fig. 13.

The described methods of anchoring a pull cord in a tampon may, of course, be employed in tampons for use in the large fluffy condition shown in Fig. 11, as well as in tampons which are compressed into the form shown in Fig. 14 before being used.

The pull cord 13 or 13a may be a piece of string, or it may be a flat tape or ribbon.

I have mentioned cotton wool as a material for constructing tampons in accordance with the invention. However, it is to be understood that various fibrous absorbent materials other than cotton have the property of retaining, while dry, a form to which they have been compressed under extreme pressure, but expanding when wetted. Any material having this property may be employed instead of cotton in the making of tampons in accordance with my invention. Examples of other materials that may be employed are flax fiber, cellucotton and wool.

Figure 6:
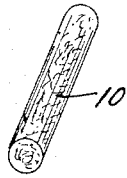
Fig. 6 is a perspective view of the finished tampon resulting from the operation shown in Figs. 2, 4 and 5.

It is also to be understood that tampons in accordance with the invention need not necessarily have the particular configuration shown in Figs. 6 and 14. They may be square, oblong or oval in cross section, instead of round and may be long or short. An elongated shape is preferable for a vaginal tampon but for some other purposes, a spherical shape, for instance, might be preferred.

Various modifications of the structure and methods described will occur to those skilled in the art and the invention is therefore to be limited only as set forth in the appended claims.

I claim:

1. As an article of manufacture, a tampon of absorbent material composed of a strip of said material wound in layers to form a roll, and having a pull cord attached thereto and extending therefrom, in which said cord is looped over one edge of one of said layers at one end of said roll, and the two ends of the cord extend back through the roll on opposite sides of said layer and thence from the opposite end of the roll.

2. As an article of manufacture, a tampon of absorbent material comprising a strip of said material wound upon itself in helical layers into a roll, in which the inner end of said strip is doubled back upon itself, with a pull cord imbedded in and extending from said tampon, in which said cord is looped over the edges of said doubled back portion of said strip at one end of said roll and the two ends of the cord extend longitudinally through the roll on opposite sides of said doubled back portion of said strip and out of the opposite end of the roll.

3. The method of manufacturing a tampon from a strip of fibrous absorbent material of slight tensile strength and attaching a pull cord thereto, which consists in the steps of first folding back one end of said strip; second, looping the pull cord over a lateral edge of said folded back portion and extending the ends across said portion on opposite sides thereof and thence away from the opposite edge and, third, winding said strip about the doubled end thereof into a roll.

4. The method of manufacturing a tampon from a strip of fibrous absorbent material and attaching a pull cord thereto, which consists in looping the pull cord over a lateral edge of said strip adjacent one end thereof and extending the ends of the cord across said strip on opposite sides thereof and thence away from the opposite edge, and then winding said strip upon itself into a roll, the end of said strip adjacent said cord being at the center of the roll.

5. The method of manufacturing a tampon from a strip of fibrous absorbent material of slight tensile strength and attaching a pull cord thereto, which consists in the steps of first folding back one end of said strip; second, looping the pull cord over a lateral edge of said folded back portion and extending the ends across said portion on opposite sides thereof and thence away from the opposite edge; third, winding said strip about the doubled end thereof into a roll and, fourth, compressing said roll radially inwardly toward the axis.

6. The method of manufacturing a tampon from a strip of fibrous absorbent material of slight tensile strength and attaching a pull cord thereto, which consists in the steps of first folding back one end of said strip; second, looping the pull cord over a lateral edge of said folded back portion and extending the ends across said portion on opposite sides thereof and thence away from the opposite edge; third, winding said strip about the doubled end thereof into a roll and, fourth, compressing said roll radially inwardly toward the axis substantially to the limit of compressibility of said material.

7. A catamenial tampon approximately cylindrical in shape and of length less than the average distance between the vaginal sphincter muscle and the cervix and consisting of fibrous, absorbent material, such as cotton, compressed transversely to substantially the limit of compressibility, but not longitudinally, said transverse compression being so intense as to maintain the tampon in its compressed size and shape during insertion, and so long as it remains in dry condition, said tampon re-expanding when wetted only transversely, and a string extending longitudinally interiorly of the tampon for the entire length thereof, one portion thereof being arranged in a single loop about the body of the material and the other portion forming ends extending outside of the tampon to form a pull cord.

8. A method of making a sanitary catamenial pack plug, comprising looping the intermediate portion of a cord about the intermediate portion of an elongated absorbent pad, then rolling the pad on itself on the loop of the cord as an axis into the form of a plug, with the loop of the cord inside the plug and the ends of the cord projecting from one end thereof.

9. The method of manufacturing a tampon which consists in looping a cord over a lateral edge of a strip of absorbent material and extending the ends of the cord across said strip on opposite sides thereof and thence away from the opposite edge, and then winding said strip upon itself into a roll with the said portions of the cord extending across the strip imbedded within the roll and the ends of the cord projecting from one end of the roll.

10. As an article of manufacture, a tampon of absorbent material composed of a strip of said material disposed in spiral formation to form a roll and having a pull cord attached thereto and extending therefrom in which said cord is looped over one edge of one of said layers at one end of said roll and the two ends of the cord extend back through the roll on opposite sides of said layer and thence from the opposite end of the roll.

DUTTON C. REYNOLDS.